(12) United States Patent
Chang et al.

(10) Patent No.: US 8,467,027 B2
(45) Date of Patent: Jun. 18, 2013

(54) DISPLAY PANEL

(75) Inventors: Chun-Huan Chang, Taipei County (TW); Chien-Hao Fu, Taipei County (TW); Chun-Kai Chang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 756 days.

(21) Appl. No.: 12/699,845

(22) Filed: Feb. 3, 2010

(65) Prior Publication Data

US 2011/0116215 A1     May 19, 2011

(30) Foreign Application Priority Data

Nov. 13, 2009   (TW) ................................ 98138642 A

(51) Int. Cl.
  *G02F 1/1343*    (2006.01)
(52) U.S. Cl.
  USPC ............ 349/149; 349/110; 349/152; 349/153
(58) Field of Classification Search
  USPC ................. 349/110, 139, 149, 150, 151, 152, 349/153; 345/87
  See application file for complete search history.

(56) References Cited

U.S. PATENT DOCUMENTS

| 5,757,450 | A  | 5/1998 | Fujii et al. |
| 6,879,367 | B2 | 4/2005 | Ukita |
| 7,267,555 | B2 | 9/2007 | Huang et al. |
| 2003/0035081 | A1 | 2/2003 | Jung et al. |
| 2003/0086048 | A1* | 5/2003 | Ukita ............................ 349/149 |
| 2005/0127359 | A1* | 6/2005 | Son ................................ 257/59 |
| 2007/0195254 | A1* | 8/2007 | Lee et al. ....................... 349/149 |

FOREIGN PATENT DOCUMENTS

| CN | 101510383 | 8/2009 |
| JP | 200240475 | 2/2002 |

OTHER PUBLICATIONS

"Office Action of Taiwan Counterpart Application", issued on Feb. 25, 2013, p1-p6, in which the listed references were cited.

* cited by examiner

*Primary Examiner* — Dung Nguyen
*Assistant Examiner* — Tai Duong
(74) *Attorney, Agent, or Firm* — Jianq Chyun IP Office

(57) ABSTRACT

A display panel including plural wiring sets is provided. Each of the wiring sets includes plural wires extending substantially along a straight direction. Each of the wiring sets has a first part and a second part respectively located at two opposite sides of a sealant. The first part is located between the sealant and an active region of the display panel, and a shortest distance of two adjacent wire segments of the first part is larger than a shortest distance of two adjacent wire segments of the second part. In addition, the shortest distance of two adjacent wire segments of the first part may be limited from about 15 μm to about 35 μm. The configuration of wiring set can reduce crosstalk of electric field between two adjacent wires to prevent light leakage and improve display quality.

9 Claims, 6 Drawing Sheets

DISPLAY PANEL

CROSS-REFERENCE TO RELATED APPLICATION

This application claims the priority benefit of Taiwan application serial no. 98138642, filed on Nov. 13, 2009. The entirety of the above-mentioned patent application is hereby incorporated by reference herein and made a part of specification.

BACKGROUND OF THE INVENTION

1. Field of the Invention

The present invention generally relates to a display panel, and more particularly, to the display panel capable of reducing light leakage by regulating a distribution of electric field in a peripheral circuit region.

2. Description of Related Art

In recent years, with great advance in the fabricating technique of electrical-optical and semiconductor devices, flat panel displays (FPDs) have been developed rapidly. Due to advantages of low operation voltage, no harmful radiation, light weight, compact size and etc., liquid crystal displays gradually replace the conventional Cathode Ray Tube (CRT) monitors and become mainstream of displays.

FIG. 1 is a schematic top view of a conventional liquid crystal display panel. As shown in FIG. 1, a liquid crystal display panel 100 comprises at least an active region 100a and a peripheral circuit region 100b in the periphery of the active region 100a. Pixel structures (not shown) are arranged in the active region 100a in an array manner and electrically connected to external devices such as flexible carriers or driving chips via wiring sets 150 in the peripheral circuit region 100b.

FIG. 2 is a schematic cross-sectional view of the liquid crystal display panel 100 of FIG. 1 at the location of the wiring sets 150. Referring to FIGS. 1 and 2, a liquid crystal layer 130 is disposed between an upper substrate 120 and a lower substrate 110. The sealant 140 substantially surrounds the liquid crystal layer 130 and crosses the wiring sets 150. Although the sealant 140 and a part of each of the wiring sets 150 are covered by the upper substrate 120 in a real condition, FIG. 1 still shows a complete profile of the sealant 140 and the wiring sets 150 for clearly demonstrating the locations of the sealant 140 and the wiring sets 150.

In the liquid crystal display panel 100, the liquid crystal layer 130 exists over the wiring sets 150 at the inner side of the sealant 140, wherein since the wiring sets 150 have a voltage difference with respect to a common electrode 170 of the upper substrate 120, an electric field E generated by the voltage difference would interfere with the alignment of liquid crystal molecules 132 of the liquid crystal layer 130. Especially in the case that two adjacent wires 152 of the wiring set 150 have a fine distance P1 or a distance between two adjacent segments 152a of a meandering wire 152 is small, an interference of electric field between the two adjacent wires 152 or the two adjacent segments 152a is unavoidably occurs and thereby results in disarrangement of liquid crystal molecules 132 and light leakage.

However, a black matrix 160 over the wiring sets 150 provides merely a certain degree of light shielding effect rather than completely preventing light leakage. Furthermore, although a bezel or a frame is provided after assembling the liquid crystal display panel 100 to form a liquid crystal display apparatus, the light shielding effect of the bezel or the frame are restricted by structural design or assembling error. The light leakage still occurs and affects the display quality of the liquid crystal display panel 100.

SUMMARY OF THE INVENTION

The present invention is directed to a display panel having a configuration of wiring set capable of reducing crosstalk of electric field and light leakage between two adjacent wires.

As embodied and broadly described herein, the present invention provides a display panel having an active region and a peripheral circuit region. The display panel comprises an active device array substrate, an opposite substrate, a display medium and a sealant. The active device array substrate has a plurality of pixel structures and a plurality of wiring sets, wherein the pixel structures are disposed in the active region in an array manner, while the wiring sets are located in the peripheral circuit region and are electrically connected to their corresponding pixel structures. Each of the wiring sets includes plural wires being disposed side by side and extending substantially along a straight direction. The opposite substrate is disposed opposite to the active device array substrate. The display medium is disposed between the active device array substrate and the opposite substrate. The sealant is disposed between the active device array substrate and the opposite substrate and the sealant surrounds the display medium. The sealant crosses at least one of the wiring sets, wherein each of the wiring sets has a first part and a second part respectively located at two opposite sides of a sealant. The first part is located between the sealant and an active region of the display panel, and a shortest distance of two adjacent wire segments of the first part is larger than a shortest distance of two adjacent wire segments of the second part.

In an embodiment of the present invention, the opposite substrate has a light-shielding layer covering the first part of each of the wiring sets.

In an embodiment of the present invention, each of the wires is in a meandering profile.

In an embodiment of the present invention, each of the wires is formed by serially and alternately connecting a plurality of first wire segments and a plurality of second wire segments. Each of the first wire segments has a first longitudinal direction, each of the second wire segments has a second longitudinal direction, and the first longitudinal direction is perpendicular to the second longitudinal direction.

In an embodiment of the present invention, the first longitudinal direction of each of the first wire segments is substantially parallel to an extending direction of the wire.

In an embodiment of the present invention, a shortest distance of the first wire segments of two adjacent wires of the first part is larger than a shortest distance of the first wire segments of two adjacent wires of the second part.

In an embodiment of the present invention, a shortest distance of two adjacent second wire segments of one of the wires of the first part is larger than a shortest distance of two adjacent second wire segments of one of the wires of the second part.

In an embodiment of the present invention, the shortest distance of two adjacent wire segments of the first part is substantially between 15 μm and 35 μm.

Another display panel having an active region and a peripheral circuit region is further provided herein. The display panel comprises an active device array substrate, an opposite substrate, a display medium and a sealant. The active device array substrate has a plurality of pixel structures and a plurality of wiring sets, wherein the pixel structures are disposed in the active region in an array manner, while the wiring sets are located in the peripheral circuit region and are electrically connected to their corresponding pixel structures. Each of the wiring sets comprises a plurality of wires disposed side by side. The opposite substrate is disposed opposite to the active device array substrate. The display medium is disposed between the active device array substrate and the opposite substrate. The sealant is disposed between the active device array substrate and the opposite substrate and the sealant surrounds the display medium. The sealant crosses at least one wiring sets, wherein the wiring set has a first part between the sealant and the active region, and a shortest distance of two adjacent wires of the first part is substantially between 15 µm and 35 µm.

In an embodiment of the present invention, the opposite substrate has a light-shielding layer covering the first part of each of the wiring sets.

In an embodiment of the present invention, each of the wires is in a meandering profile.

In an embodiment of the present invention, each of the wires of the first part is formed by serially and alternately connecting a plurality of first wire segments and a plurality of second wire segments. Each of the first wire segments has a first longitudinal direction, each of the second wire segments has a second longitudinal direction, and the first longitudinal direction is perpendicular to the second longitudinal direction.

In an embodiment of the present invention, the first longitudinal direction of each of the first wire segments is substantially parallel to an extending direction of the wire.

In an embodiment of the present invention, the shortest distance of the first wire segments of two adjacent wires of the first part is substantially between 15 µm and 35 µm.

In an embodiment of the present invention, the shortest distance of two adjacent second wire segments of one of the wires of the first part is substantially between 15 µm and 35 µm.

In view of the above, the configuration of wires of the display panel is regulated to optimize the distribution of electric field between the sealant and the active region. Therefore, the crosstalk of electric field between two adjacent wires can be reduced, and the disarrangement of liquid crystal molecules can be alleviated, so as to prevent light leakage and obtain superior display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
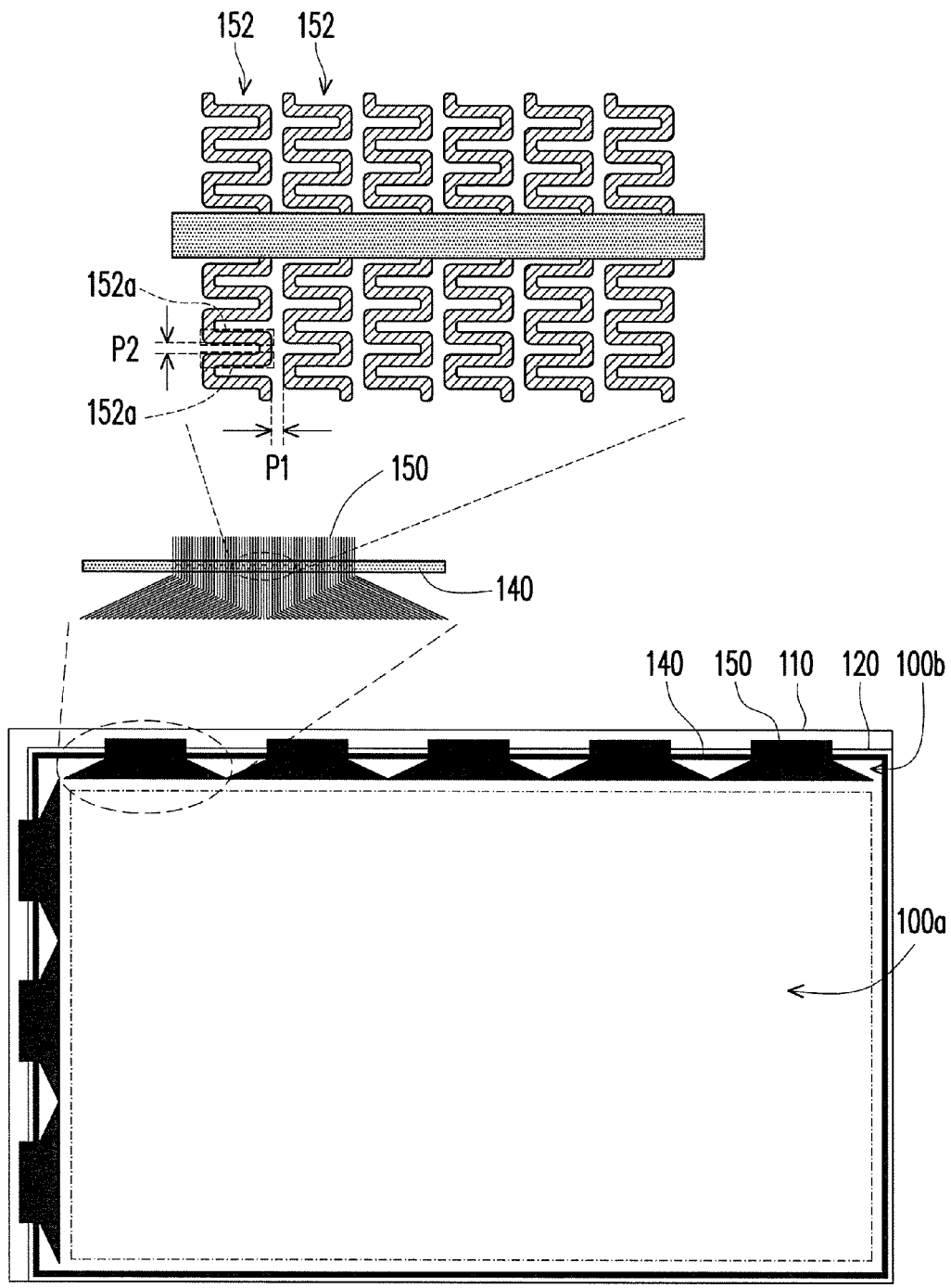
FIG. 1 is a schematic top view of a conventional liquid crystal display panel.
Figure 2:
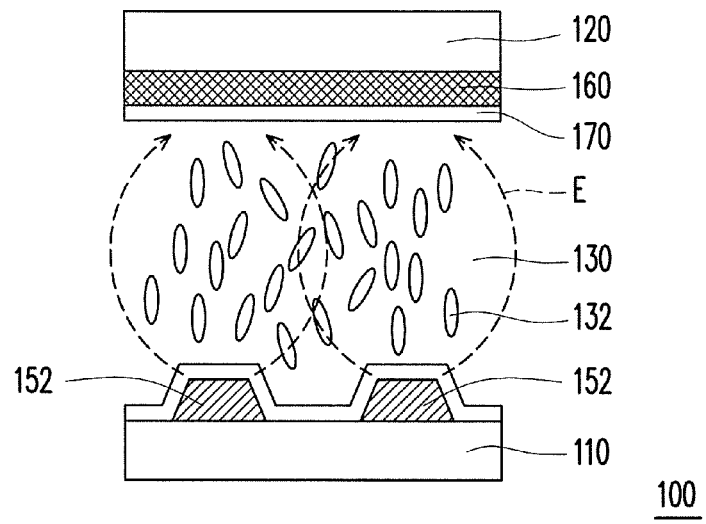
FIG. 2 is a schematic cross-sectional view of the liquid crystal display panel of FIG. 1 at the location of wiring sets.
Figure 3:
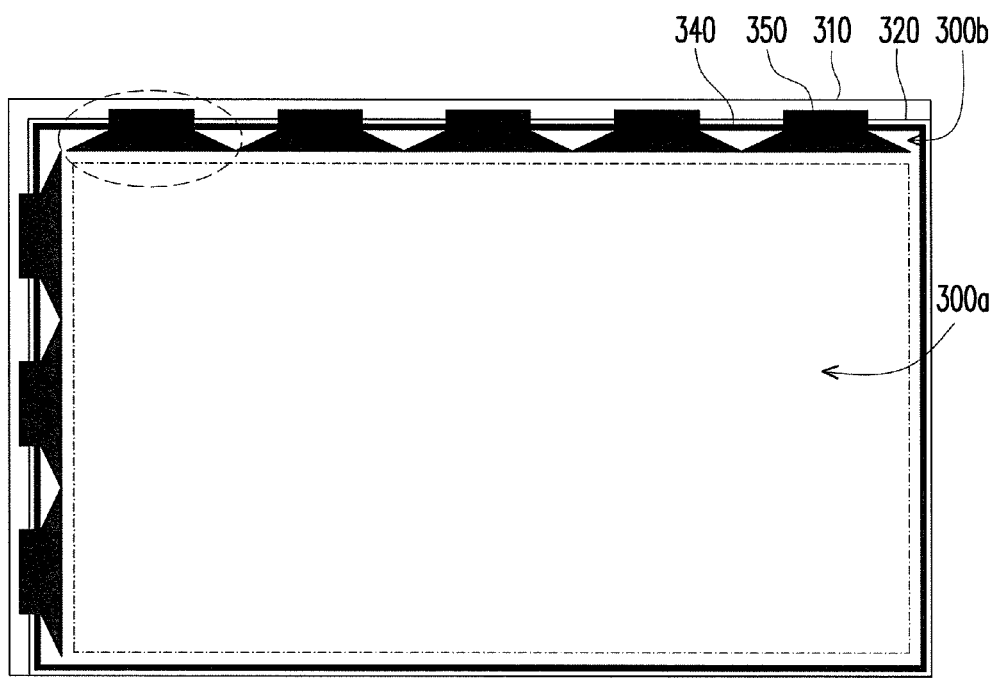
FIG. 3 is a schematic top view of a display panel according to an embodiment of the present invention.
Figure 4:
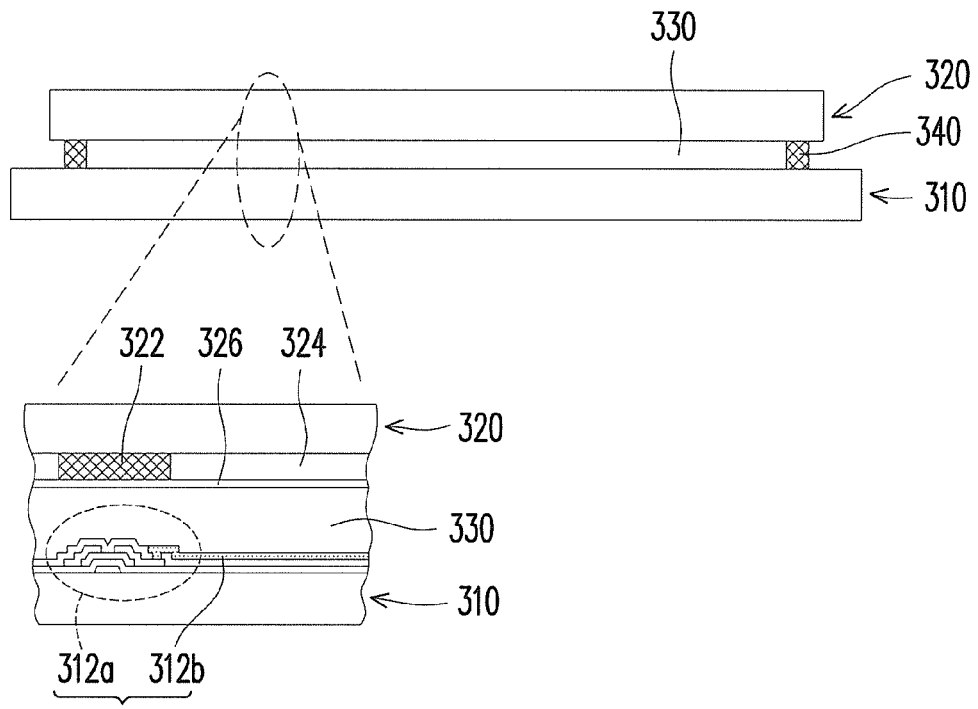
FIG. 4 is a schematic partial cross-sectional view of the display panel in FIG. 3.

FIG. 3 is a schematic top view of a display panel according to an embodiment of the present invention. FIG. 4 is a schematic partial cross-sectional view of the display panel in FIG. 3.

As shown in FIGS. 3 and 4, the display panel 300 comprises an active region 300a and a peripheral circuit region 300b in the periphery of the active region 300a. The display panel 300 comprises an active device array substrate 310, an opposite substrate 320, a display medium 330 and a sealant 340. The active device array substrate 310 has a plurality of pixel structures 312 and a plurality of wiring sets 350, wherein the pixel structures 312 are disposed in the active region 300a in an array manner, while the wiring sets 350 are located in the peripheral circuit region 300b and are electrically connected to their corresponding pixel structures 312. Specifically, each of the wiring sets 350 electrically connected between the corresponding gates of the pixel structures 312 and an external gate driver or electrically connected between the corresponding sources of the pixel structures 312 and an external source driver.

In addition, the opposite substrate 320 is disposed opposite to the active device array substrate 310. The display medium 330 is disposed between the active device array substrate 310 and the opposite substrate 320. The sealant 340 is disposed between the active device array substrate 310 and the opposite substrate 320 and the sealant 340 surrounds the display medium 330. Although the sealant 340 and a part of each of the wiring sets 350 are covered by the upper substrate 120 in a real condition, FIG. 3 still shows a complete profile of the sealant 340 and the wiring sets 350 for clearly demonstrating the locations of the sealant 340 and the wiring sets 350.

In this embodiment, each of the pixel structures 312 has for example a conventional configuration, such as the one comprising a thin film transistor 312a and a pixel electrode 312b. In other words, the active device array substrate 310 may be a thin film transistor (TFT) array substrate, while the opposite substrate 320 may be a color filter substrate comprising a black matrix 322, a color filter layer 324 and a common electrode 326. In addition, the display medium 330 may be a liquid crystal layer or other proper display mediums. People skilled in the art are likely to change or regulate the configuration of the pixel structures 312 and the type of the display medium 330, and therefore no further description is provided herein.

Otherwise, the active device array substrate 310 may further be a color filter on array (COA) substrate or a black matrix on array (BOA) substrate. Depending on different types of active device array substrates 310 or various design requirements, the color filter layer 324 or the black matrix 322 of the opposite substrate 320 may be omitted.

Figure 5:
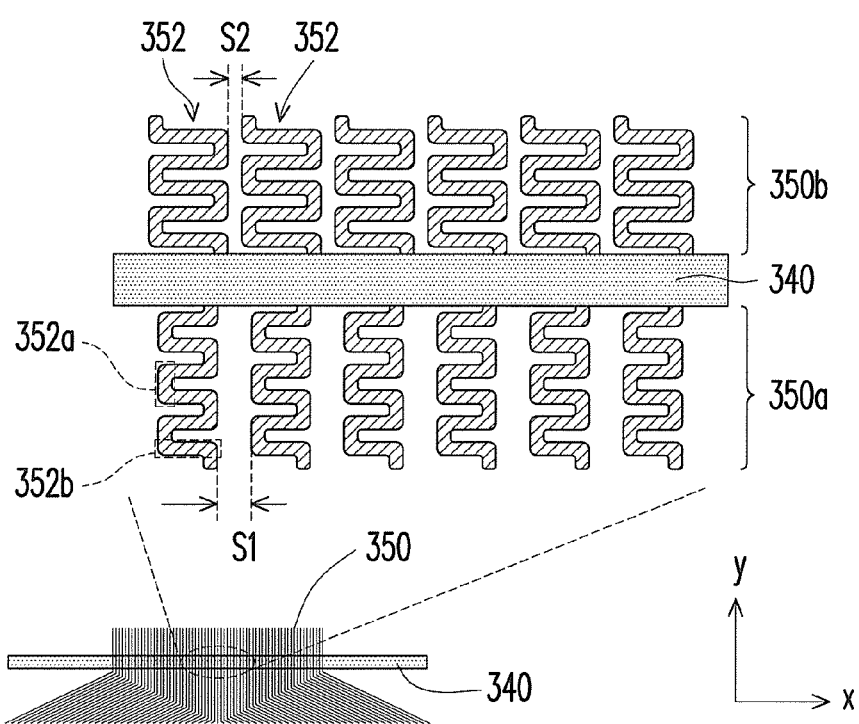
FIG. 5 is a partial enlarged view of one of the wiring sets in FIG. 3.

FIG. 5 is a partial enlarged view of one of the wiring sets 350 in FIG. 3. Referring to FIG. 5, each of the wiring sets 350 includes plural wires 352 being disposed side by side and extending substantially along a straight direction, wherein each of the wires 352 is in a meandering profile. The wires 352 of this embodiment are defined as the part of the wires 352 arranged parallel to one another, i.e. those circled by the dotted line in FIG. 5, rather than those spreading out towards the active region 300a. The sealant 340 crosses each of the wiring sets 350. Each of the wiring sets 350 has a first part 350a and a second part 350b respectively located at two opposite sides of the sealant 340, wherein the first part 350a is located between the sealant 340 and the active region 300a, while the second part 350b is located at another side of the sealant 340. In other words, the first part 350a is located inside the region surrounded by the sealant 340 and thereby corresponding to a part of the display medium 330. Furthermore, in a proper condition, the black matrix 322 of the opposite substrate 320 functions as a light shielding layer and may cover the first part 350a of each of the wiring sets 350, so as to alleviate light leakage at the peripheral circuit region 300b near the display medium 330.

Regarding the interference of electric field due to fine pitch of the wires in the prior art, the wires 352 of the first part 350a inside the sealant 340 may cause malfunction of the display medium 330 and then lead to light leakage. To prevent the above problem, the illustrated embodiment regulates the configuration of the wires 352 of the first part 350a inside the sealant 340, wherein a shortest distance of two adjacent wire segments of the first part 350a is larger than a shortest distance of two adjacent wire segments of the second part 350b. In other words, the shortest distance between two adjacent wire segments of the first part 350a is increased to prevent the electric fields of the two adjacent wire segments getting too close and being interfered with each other. Herein, the shortest distance of two adjacent wire segments can be a shortest distance between two adjacent individual wires 352 or a shortest distance between two adjacent segments of a meandering wire 352.

FIG. 5 schematically illustrates a design regarding a shortest distance between two adjacent individual wires 352, wherein a shortest distance S1 between two adjacent wires 352 of the first part 350a is larger than a shortest distance S2 between two adjacent wires 352 of the second part 350b.

Particularly, each of the wires 352 of FIG. 5 is in a meandering profile and is formed by serially and alternately connecting a plurality of first wire segments 352a and a plurality of second wire segments 352b. For example, for a single wire 352, one of the first wire segments 352a is connected between two adjacent second wire segments 352b or, one of the second wire segments 352b is connected between two adjacent first wire segments 352a. Each of the first wire segments 352a has a first longitudinal direction, i.e. the Y direction in FIG. 5, each of the second wire segments 352b has a second longitudinal direction, i.e. the X direction in FIG. 5, and the first longitudinal direction (Y direction) is substantially perpendicular to the second longitudinal direction (X direction). Furthermore, the first longitudinal direction (Y direction) of each of the first wire segments 352a is substantially parallel to an extending direction of the wire 352, while the second longitudinal direction (X direction) of each of the second wire segments 352b is substantially perpendicular to an extending direction of the wire 352. In other words, as shown in FIG. 5, the shortest distance S1 of two adjacent wires 352 of the first part 350a is larger than the shortest distance S2 of two adjacent wires 352 of the second part 350b.

Figure 6:
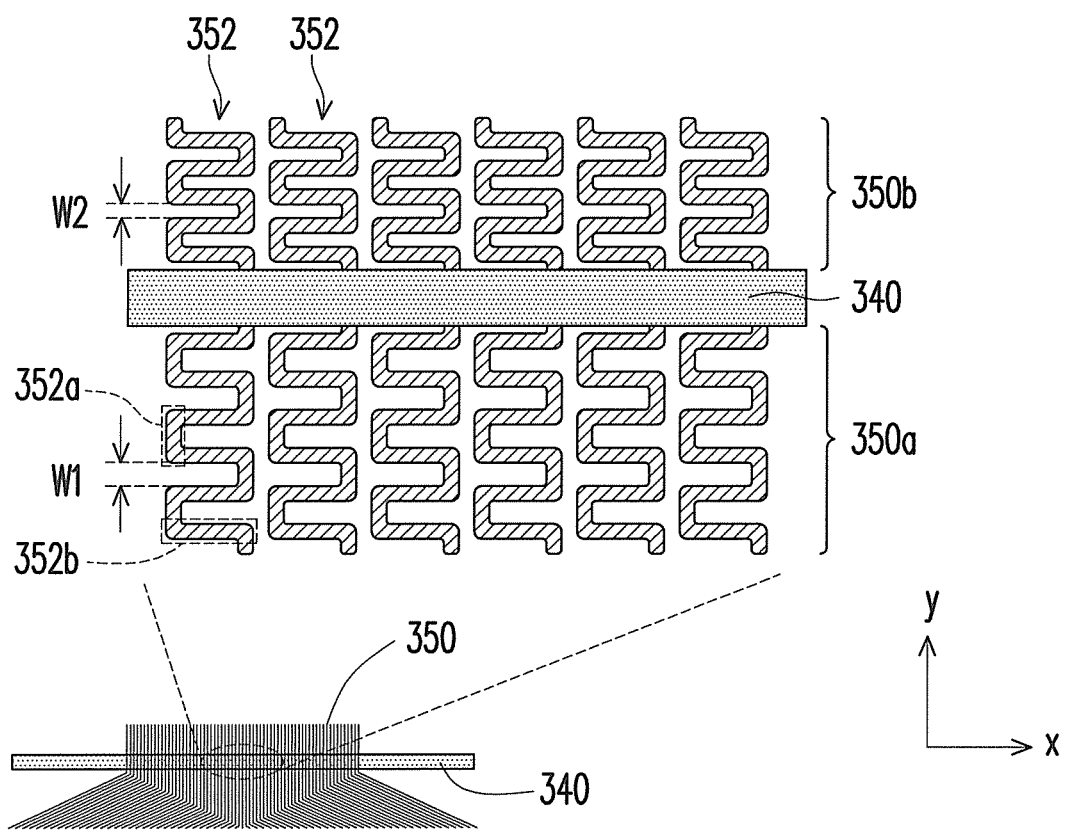
FIG. 6 further shows another wiring set according an embodiment of the present invention.

Depending on the structure in FIG. 5, FIG. 6 further shows another wiring set according an embodiment of the present invention, wherein components identical or similar to those of FIG. 5 are denoted with the same numerals and the descriptions thereof are not repeated herein. Referring to FIG. 6, a shortest distance between two adjacent segments of a wire 352 is regulated, wherein a shortest distance W1 between two adjacent segments of a wire 352 of the first part 350a is larger than a shortest distance W2 between two adjacent segments of the said wire 352 or another wire 352 of the second part 350b.

In other words, each of the wires 352 may be in the meandering profile as illustrated in FIG. 5, wherein the shortest distance W1 of two adjacent second wire segments 352b (horizontal segments) of one of the wires 352 of the first part 350a is larger than the shortest distance W2 of two adjacent second wire segments 352b of the said wire 352 or another wire 352 of the second part 350b.

Figure 7:
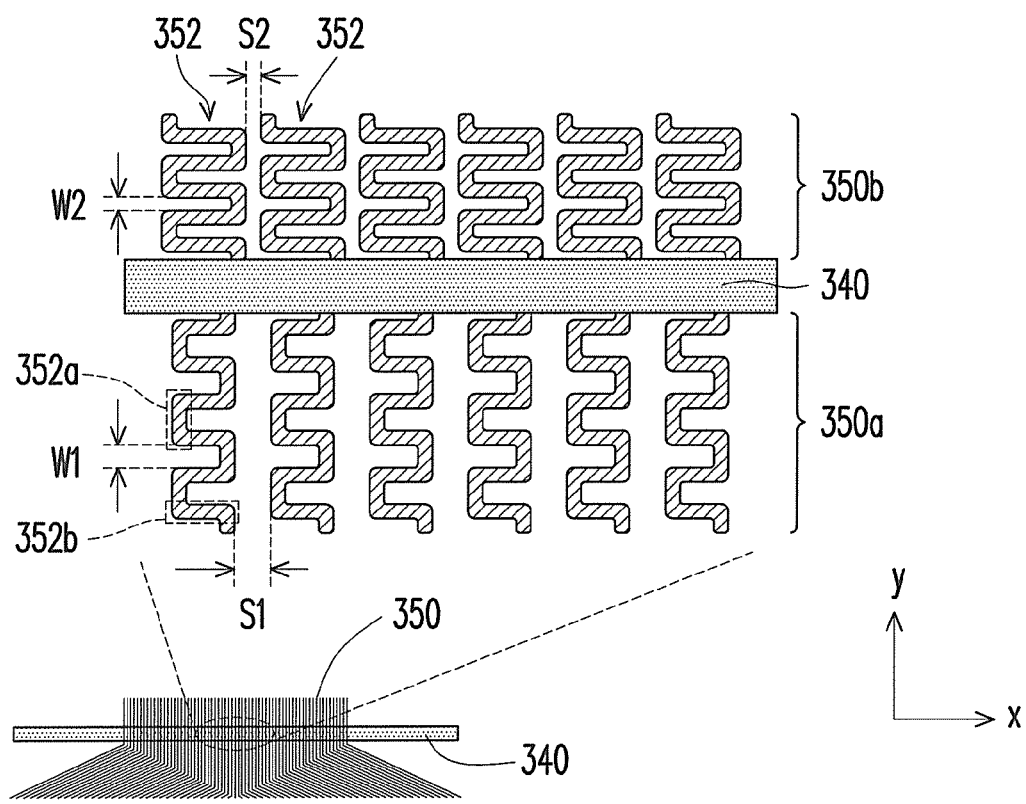
FIG. 7 further shows another wiring set according an embodiment of the present invention.

Furthermore, both of the shortest distance between two adjacent individual wires and the shortest distance between two adjacent segments of a wire can be regulated at the same time in the present invention. Depending on the structures in FIGS. 5 and 6, FIG. 7 further shows another wiring set according an embodiment of the present invention, wherein components identical or similar to those of FIGS. 5 and 6 are denoted with the same numerals and the descriptions thereof are not repeated herein. Referring to FIG. 7, both of a shortest distance between two adjacent individual wires 352 and a shortest distance between two adjacent segments of a wire 352 is regulated, wherein a shortest distance S1 between two adjacent wires 352 of the first part 350a is larger than a shortest distance S2 between two adjacent wires 352 of the second part 350b, and a shortest distance W1 between two adjacent segments 352b of a wire 352 of the first part 350a is larger than a shortest distance W2 between two adjacent segments 352b of the said wire 352 or another wire 352 of the second part 350b.

In other words, each of the wires 352 may be in the meandering profile as illustrated in FIGS. 5 and 6, wherein the shortest distance S1 of two adjacent wires 352 of the first part 350a is larger than the shortest distance S2 of two adjacent wires 352 of the second part 350b, and the shortest distance W1 of two adjacent second wire segments 352b of one of the wires 352 of the first part 350a is larger than the shortest distance W2 of two adjacent second wire segments 352b of the said wire 352 or another wire 352 of the second part 350b.

On the other hand, the shortest distance S1 or W1 of the aforementioned embodiments can be limited in a preferred range. Preferably, the shortest distance S1 or W1 may be limited from 15 μm to 35 μm, so as to dramatically reduce the interference of electric field between two adjacent wire segments and achieve superior display quality.

In the above embodiments, the relationship of the shortest distance between two adjacent wire segments inside the sealant and the shortest distance between two adjacent wire segments outside the sealant is defined by taking the sealant as a boundary, so as to obtain preferred distribution of electric field. However, in other embodiments of the present invention, the relationship of the shortest distance between two adjacent wire segments inside the sealant and outside the sealant is no longer regarded, while instead, only the shortest distance between two adjacent wire segments inside the sealant (i.e. the first part of the wiring set) should be defined. In other words, the shortest distance S1 or W1 may are limited from 15 μm to 35 μm, so as to reduce the interference of electric field between two adjacent wire segments and achieve superior display quality.

Figure 8:
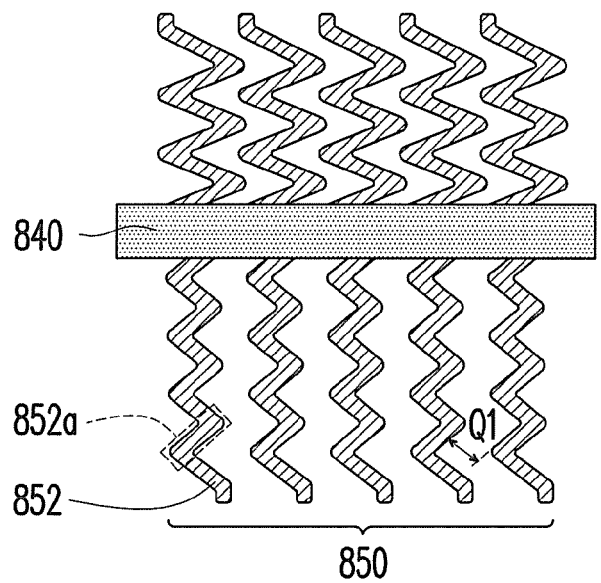
FIGS. 8 and 9 further illustrate wiring sets in different profiles according to other embodiments of the present invention.
Figure 9:
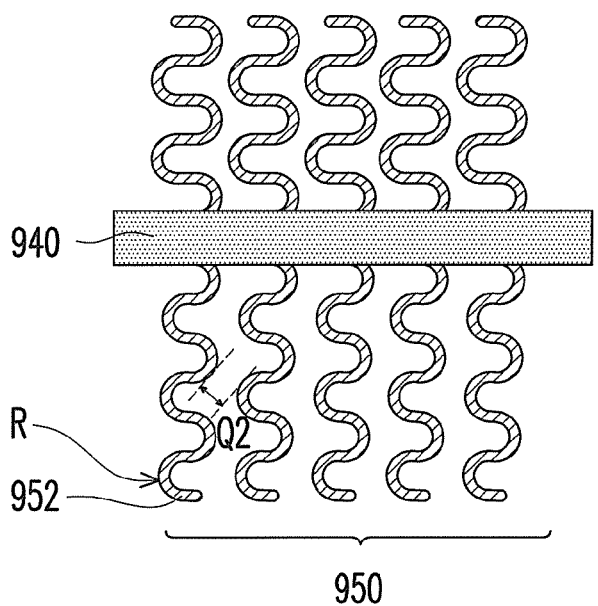

Nevertheless, the profile of wires of the present invention is not limited to the above embodiments, while the shortest distance S1 or W1 may be varied with the profile of their corresponding wires. FIGS. 8 and 9 further illustrate wiring sets in different profiles according to other embodiments of the present invention. In the wiring set 850 of FIG. 8, the shortest distance Q1 between the wire segments 852a of two adjacent wires 852 inside the sealant 840 is defined. Moreover, in the wiring set 950 of FIG. 9, the curved portion R of each of the wires 952 has a rounded angle, and the shortest distance Q2 between the curved portions R of two adjacent wires 952 inside the sealant 940 is defined.

In summary, the configuration of the wires of the display panel is regulated in the present invention, wherein the shortest distance between two adjacent wire segments at one side of the sealant adjacent to the active region is larger to that at the other side of the sealant, or otherwise, the shortest distance between two adjacent wire segments between the sealant and the active region is defined, so as to regulate the distribution of electric field between the sealant and the active region. Since the shortest distance between two adjacent wire segments is limited in a preferred range, the interference of electric field between two adjacent wires can be alleviated, and thereby the disarrangement of liquid crystal molecules can be reduced to prevent light leakage. Thus, the display panel of the present invention can provide favorable display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display panel having an active region and a peripheral circuit region, the display panel comprising:
    an active device array substrate including a plurality of pixel structures and a plurality of wiring sets, wherein the pixel structures are disposed in the active region in an array manner, while the wiring sets are located in the peripheral circuit region and are electrically connected to their corresponding pixel structures, each of the wiring sets includes a plurality of wires;
    an opposite substrate disposed opposite to the active device array substrate;
    a display medium, disposed between the active device array substrate and the opposite substrate; and
    a sealant disposed between the active device array substrate and the opposite substrate, the sealant crossing at least one of the wiring sets, wherein the wiring set has a first part and a second part respectively located at two opposite sides of the sealant, the first part is located between the sealant and the active region of the display panel, and a shortest distance of two adjacent wire segments of the first part is larger than a shortest distance of two adjacent wire segments of the second part, wherein each of the wires is formed by serially and alternately connecting a plurality of first wire segments and a plurality of second wire segments, each of the first wire segments has a first longitudinal direction, each of the second wire segments has a second longitudinal direction perpendicular to the first longitudinal direction, the first longitudinal direction of each of the first wire segments is substantially parallel to an extending direction of the wire, and a shortest distance of the first wire segments of two adjacent wires of the first part is larger than a shortest distance of the first wire segments of two adjacent wires of the second part.

2. The display panel as claimed in claim 1, wherein the opposite substrate comprises a light-shielding layer covering the first part of each of the wiring sets.

3. The display panel as claimed in claim 1, wherein each of the wires is in meandering profile.

4. The display panel as claimed in claim 1, wherein the shortest distance of two adjacent wire segments of the first part is substantially between 15 μm and 35 μm.

5. A display panel having an active region and a peripheral circuit region, the display panel comprising:
    an active device array substrate including a plurality of pixel structures and a plurality of wiring sets, wherein the pixel structures are disposed in the active region in an array manner, while the wiring sets are located in the peripheral circuit region and are electrically connected to their corresponding pixel structures, each of the wiring sets comprises a plurality of wires;
    an opposite substrate disposed opposite to the active device array substrate;
    a display medium, disposed between the active device array substrate and the opposite substrate; and
    a sealant disposed between the active device array substrate and the opposite substrate, the sealant crossing at least one of the wiring sets, wherein the wiring set has a first part located between the sealant and the active region, and a shortest distance of two adjacent wire segments of the first part is substantially between 15 μm and 35 μm, wherein each of the wires of the first part is formed by serially and alternately connecting a plurality of first wire segments and a plurality of second wire segments, each of the first wire segments has a first longitudinal direction, each of the second wire segments has a second longitudinal direction, the first longitudinal direction is perpendicular to the second longitudinal direction, the first longitudinal direction of each of the first wire segments is substantially parallel to an extending direction of the wire, and the shortest distance of the first wire segments of two adjacent wires of the first part is substantially between 15 μm and 35 μm.

6. The display panel as claimed in claim 5, wherein the opposite substrate comprises a light-shielding layer covering the first part of each of the wiring sets.

7. The display panel as claimed in claim 5, wherein each of the wires is in meandering profile.

8. A display panel having an active region and a peripheral circuit region, the display panel comprising:
    an active device array substrate including a plurality of pixel structures and a plurality of wiring sets, wherein the pixel structures are disposed in the active region in an array manner, while the wiring sets are located in the peripheral circuit region and are electrically connected to their corresponding pixel structures, each of the wiring sets includes a plurality of wires;
    an opposite substrate disposed opposite to the active device array substrate;
    a display medium, disposed between the active device array substrate and the opposite substrate; and
    a sealant disposed between the active device array substrate and the opposite substrate, the sealant crossing at least one of the wiring sets, wherein the wiring set has a first part and a second part respectively located at two opposite sides of the sealant, the first part is located between the sealant and the active region of the display panel, each of the wires is formed by serially and alternately connecting a plurality of first wire segments and a plurality of second wire segments, each of the first wire segments has a first longitudinal direction, each of the second wire segments has a second longitudinal direction perpendicular to the first longitudinal direction, the first longitudinal direction of each of the first wire segments is substantially parallel to an extending direction of the wire, and a shortest distance of two adjacent second wire segments of one of the wires of the first part is larger than a shortest distance of two adjacent second wire segments of one of the wires of the second part.

9. A display panel having an active region and a peripheral circuit region, the display panel comprising:

an active device array substrate including a plurality of pixel structures and a plurality of wiring sets, wherein the pixel structures are disposed in the active region in an array manner, while the wiring sets are located in the peripheral circuit region and are electrically connected to their corresponding pixel structures, each of the wiring sets comprises a plurality of wires;

an opposite substrate disposed opposite to the active device array substrate;

a display medium, disposed between the active device array substrate and the opposite substrate; and a sealant disposed between the active device array substrate and the opposite substrate, the sealant crossing at least one of the wiring sets, wherein the wiring set has a first part located between the sealant and the active region, each of the wires of the first part is formed by serially and alternately connecting a plurality of first wire segments and a plurality of second wire segments, each of the first wire segments has a first longitudinal direction, each of the second wire segments has a second longitudinal direction, the first longitudinal direction is perpendicular to the second longitudinal direction, the first longitudinal direction of each of the first wire segments is substantially parallel to an extending direction of the wire, and the shortest distance of two adjacent second wire segments of one of the wires of the first part is substantially between 15 μm and 35 μm.

* * * * *